(12) United States Patent
Goyal et al.

(10) Patent No.: US 11,500,874 B2
(45) Date of Patent: Nov. 15, 2022

(54) SYSTEMS AND METHODS FOR LINKING METRIC DATA TO RESOURCES

(71) Applicant: ServiceNow, Inc., Santa Clara, CA (US)

(72) Inventors: Ritika Goyal, Seattle, WA (US); Szu-hsuan Lee, San Diego, CA (US); Vincent Seguin, Encinitas, CA (US); Kanwaldeep Kaur Dang, Sammamish, WA (US); Anand Nikhil Mehta, Bellevue, WA (US)

(73) Assignee: ServiceNow, Inc., Santa Clara, CA (US)

( * ) Notice: Subject to any disclaimer, the term of this patent is extended or adjusted under 35 U.S.C. 154(b) by 284 days.

(21) Appl. No.: 16/255,515

(22) Filed: Jan. 23, 2019

(65) Prior Publication Data
US 2020/0233870 A1   Jul. 23, 2020

(51) Int. Cl.
*G06F 16/22*      (2019.01)
*G06F 16/2455*    (2019.01)
*G06F 16/28*      (2019.01)

(52) U.S. Cl.
CPC .... *G06F 16/24554* (2019.01); *G06F 16/2282* (2019.01); *G06F 16/282* (2019.01); *G06F 16/285* (2019.01)

(58) Field of Classification Search
CPC .......................... G06F 11/3409; G06F 16/2282
See application file for complete search history.

(56) References Cited

U.S. PATENT DOCUMENTS

| | | | |
|---|---|---|---|
| 5,872,913 A * | 2/1999 | Berry | G06F 11/3409 714/31 |
| 6,321,229 B1 | 11/2001 | Goldman | |
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |

(Continued)

OTHER PUBLICATIONS

U.S. Appl. No. 16/513,079, filed Jul. 16, 2019, Kanwaldeep Dang.
(Continued)

*Primary Examiner* — Grace Park
(74) *Attorney, Agent, or Firm* — Fletcher Yoder PC

(57) ABSTRACT

The present approach relates generally to systems and methods for outputting metric data from resources with a database accessible by a client instance. The client instance is hosted by one or more data centers and accessible by one or more remote client networks. In accordance with the present approach, a request to track metric data related to a resource is received. Further, a configuration item (CI) is retrieved from a database accessible by the client instance based at least in part on data associated with the request. Further, a type of CI is identified. Even further, a resource type associated with the type of the CI is identified based at least in part on a resource abstraction layer accessible by the client instance. Further still, the resource type is linked to the resource table and metric data associated with the resource is outputted.

20 Claims, 8 Drawing Sheets

| | CI | RESOURCE | DISK_USAGE | DISK_FREE_SPACE | DISK_HITS |
|---|---|---|---|---|---|
| 222a | CUST1_WIN_SERVER | D1 | 80 | 5 | 90 |
| 222b | CUST1_WIN_SERVER | D2 | 60 | 20 | 20 |
| 222c | CUST2_WIN_SERVER | D1 | 70 | 10 | 50 |
| 222d | CUST3_WIN_SERVER | D3 | 90 | 2 | 100 |
| 222e | CUST4_WIN_SERVER | D4 | 40 | 30 | 120 |

(220; columns 224, 226, 228, 230, 232)

(56) References Cited

U.S. PATENT DOCUMENTS

| | | |
|---|---|---|
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 3,051,164 A1 | 11/2011 | Peuter |
| 8,082,222 B2 | 12/2011 | Rangarajan |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,904,412 B2* | 12/2014 | Ho .................... G06F 11/3476 719/328 |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,516,108 B1 | 12/2016 | Sullivan et al. |
| 9,535,737 B2 | 1/2017 | Joy |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,819,929 B2 | 11/2017 | Moon |
| 9,852,165 B2 | 12/2017 | Morozov |
| 9,875,061 B2 | 1/2018 | Sullivan et al. |
| 10,002,203 B2 | 6/2018 | George |
| 10,198,212 B2 | 2/2019 | Sullivan et al. |
| 10,469,309 B1 | 11/2019 | Gupta et al. |
| 2009/0106459 A1* | 4/2009 | Abels ................. H04L 41/0853 710/10 |
| 2011/0231582 A1* | 9/2011 | Uysal ................. G06F 11/3409 710/15 |
| 2012/0266177 A1* | 10/2012 | Kakeda .................. G06F 3/061 718/104 |
| 2014/0047102 A1* | 2/2014 | Nitin ................... H04L 41/0853 709/224 |
| 2016/0004551 A1* | 1/2016 | Terayama ........... G06F 9/45558 718/1 |
| 2017/0010948 A1* | 1/2017 | Kumar ................ G06F 11/3093 |
| 2017/0329390 A1 | 11/2017 | Shah et al. |
| 2018/0293284 A1 | 10/2018 | Shah et al. |
| 2018/0322556 A1 | 11/2018 | Padmanabh et al. |
| 2018/0322558 A1 | 11/2018 | Padmanabh et al. |
| 2019/0102276 A1 | 4/2019 | Dang et al. |
| 2019/0149511 A1 | 5/2019 | Dias et al. |
| 2019/0243549 A1 | 8/2019 | Sullivan et al. |
| 2019/0340290 A1 | 11/2019 | Dang et al. |
| 2019/0340300 A1 | 11/2019 | Srinivasamurthy et al. |

OTHER PUBLICATIONS

U.S. Appl. No. 16/402,896, filed May 3, 2019, Kanwaldeep Kaur Dang.

U.S. Appl. No. 14/503,505, filed Oct. 1, 2014, Sridhar Chandrashekar.

* cited by examiner

| | CUST1.D1.USAGE | CUST1.D2.USAGE | CUST2.D1.USAGE | CUST3.D3.USAGE | CUST4.D4.HITS |
|---|---|---|---|---|---|
| CUST1_WIN_SERVER | 80 | 70 | | | |
| CUST2_WIN_SERVER | | | 90 | | |
| CUST3_WIN_SERVER | | | | 80 | |
| CUST4_WIN_SERVER | | | | | 98 |

FIG. 6

| ≡ CONFIGURATION ITEM TYPE | ≡ RESOURCE CLASS |
|---|---|
| SEARCH | SEARCH |
| ☐ ⊖ CMDB_CI_DATABASE | RESOURCE_DATABASE |
| ☐ ⊖ CMDB_CI_APPL | RESOURCE_APPL |
| ☐ ⊖ CMDB_CI_HARDWARE | RESOURCE_HARDWARE |
| ☐ ⊖ CMDB_CI_VM_OBJECT | RESOURCE_VM_OBJECT |
| ☐ ⊖ CMDB_CI_SERVICE | RESOURCE_SERVICE |

FIG. 7

| 220 | 224 | 226 | 228 | 230 | 232 |
|---|---|---|---|---|---|
| | CI | RESOURCE | DISK_USAGE | DISK_FREE_SPACE | DISK_HITS |
| 222a | CUST1_WIN_SERVER | D1 | 80 | 5 | 90 |
| 222b | CUST1_WIN_SERVER | D2 | 60 | 20 | 20 |
| 222c | CUST2_WIN_SERVER | D1 | 70 | 10 | 50 |
| 222d | CUST3_WIN_SERVER | D3 | 90 | 2 | 100 |
| 222e | CUST4_WIN_SERVER | D4 | 40 | 30 | 120 |

FIG. 8

| 240 | 244 | 246 | 248 | 250 | 252 |
|---|---|---|---|---|---|
| | CI | RESOURCE | AVG_RESP_TIME | AVG_EXCL_TIME | HITS |
| 242a | ORDERSERVICE | LOGINPAGE | 80 | 5 | 9000 |
| 242b | ORDERSERVICE | UNSIGNEDHOMEPAGE | 60 | 20 | 2000 |
| 242c | ORDERSERVICE | SIGNEDINHOMEPAGE | 70 | 10 | 5000 |

FIG. 9

SYSTEMS AND METHODS FOR LINKING METRIC DATA TO RESOURCES

BACKGROUND

The present disclosure relates generally to improving database queries via a resource abstraction layer.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various types of data may be organized and stored in databases that are created, stored, and maintained on different types of computer-based systems. Examples of such databases include relational databases, which may be used to store data ranging from personal information or data developed in large-scale industrial, commercial, and governmental contexts. Thus, such stored data sets may range from the trivially small in size to those that may encompass tens millions of records and data points, or more. As the number of records and the number of defined fields within a database grow in number however, the limitations of a given database architecture may impact the capability of a given database to be used efficiently.

By way of example, certain types of databases employ multiple tables to organize data, with different tables being configured (based on the fields defined for a respective table) to logically correspond to different portions of the data. The tables may themselves be logically associated one with another based on known relationships between fields of different tables, such as different tables having a common field or fields that can be used to relate the data stored in the different tables. The ability to join tables of data together in this manner allows different combinations of data fields to be accessed in a multi-table database to allow a user to flexibly query the data based on current needs. While certain implementations of organizing multiple tables within a database may be efficient for monitoring certain resources utilized by an enterprise, such implementations may be less efficient for monitoring other resources such as disks, processors, and/or web pages within an application.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As discussed in greater detail below, the present approach improves the query performance of a database in a manner that is transparent to a user. In particular, this approach includes a resource abstraction layer that links metric data to certain resources that were previously memory intensive to monitor due to the granularity of the resources within the table hierarchy. In some embodiments, the resource abstraction layer may be a table or a category that links certain tracked configuration items with particular or relevant resources thereby linking queries for metric data associated with certain assets in a less memory intensive manner.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 6 shows an example of a configuration item (CI) table;

FIG. 7 shown an example of a resource abstraction layer, in accordance with aspects of the present disclosure;

FIG. 8 shows an example of a resource table, in accordance with aspects of the present disclosure; and FIG. 9 show an additional example of a resource table related to webpages of an application, in accordance with aspects of the present disclosure.

DETAILED DESCRIPTION

Figure 1:
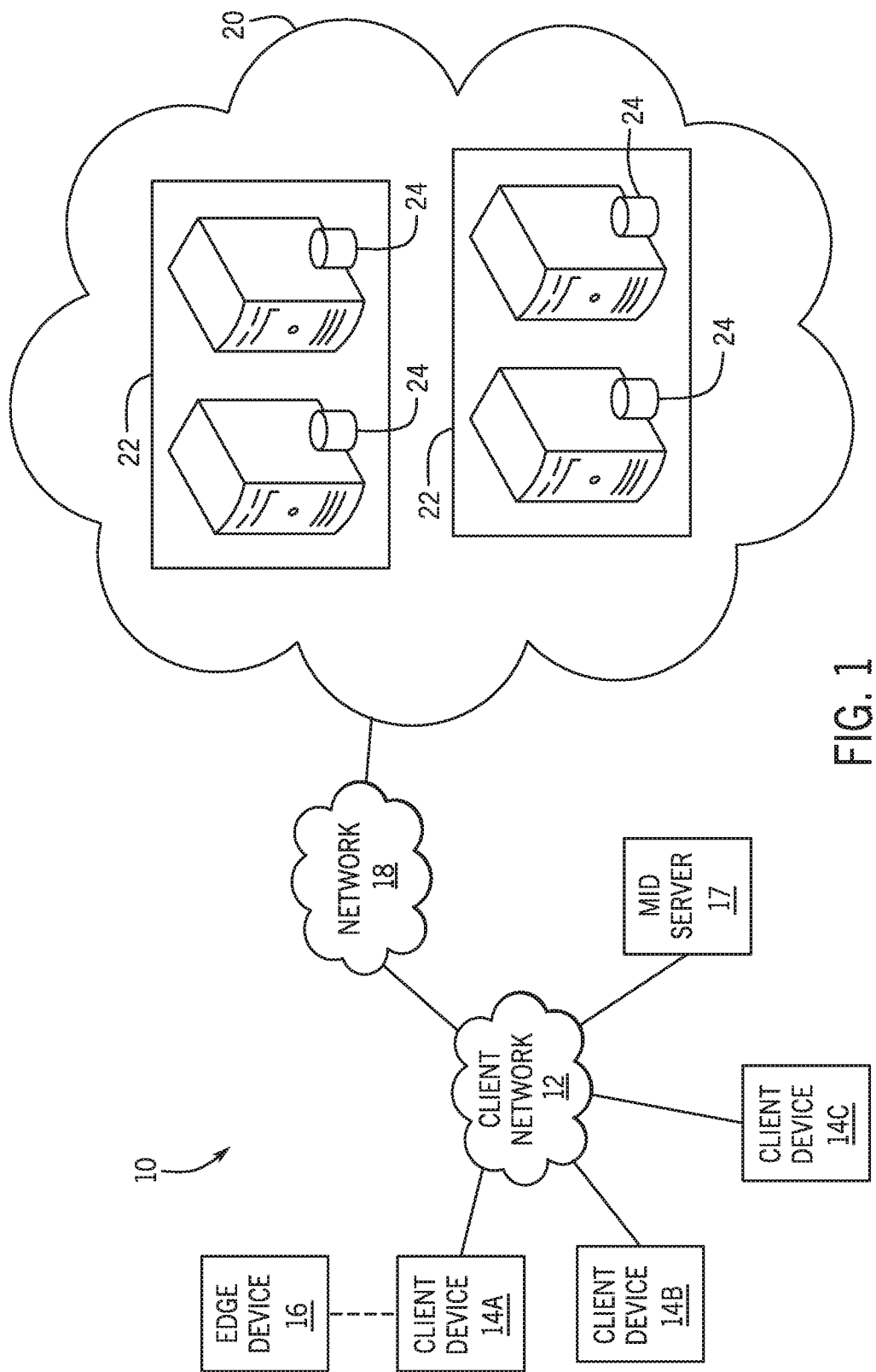
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, internet of things (IoT) technology, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a configuration management database (CMDB). As used herein, the term "metric" refers to data indicative of a measure of use or effectiveness of an asset and/or the term "metric" may refer to a key-performance indicator for assets such as applications.

As discussed herein, an organization may employ a database having tables that contain data related to the assets and services of the organization. The tables are generally organized based on certain configuration hierarchies. That is, in the case of a configuration management database, the database may include multiple tables having configuration items and data associated with each configuration item. A user, such as a an employee, IT specialist, administrator, and the like, may submit a query to monitor metric data associated with certain configuration items such as a performance metric, errors, access, usage, and the like. The query may result in an output that is related to data of the query. While certain configuration hierarchies are efficient for organizing certain CIs, it may be less efficient to organize other CIs.

For example, it may not be advantageous to store tables with fields storing metric data for granular CIs such as disks, router interfaces, applications, and/or processors due to the overhead associated with configuration item lifecycle maintenance. Instead, granular CIs may be organized using a different hierarchy such as a resource hierarchy, as discussed herein. Further, in certain situations, it may be desirable to monitor certain assets that are not conventionally considered CIs, such as webpages of an application or components of the application that may not typically be represented in a table within the CMDB. In such cases, it may be advantageous to include a resource abstraction layer, such as in the form of a table, within the CMDB which operates to link metric data to certain resources thereby reducing overhead and memory usage associated with maintaining and monitoring granular CIs and, thus, improve the efficiency resource management within the enterprise.

More specifically, in conventional implementations for binding metrics to IT resources, data is bound at the CI level, requiring that each resource to be tracked (e.g., for monitoring metric data) be tracked and allocated as a CI, which can be exceedingly data intensive once you are tracking resources down to the hard drive or memory allocation level of a large number of devices. The present approach instead employs a resource abstraction layer in the form of a resource table or category that, will allow resources to be linked to a CI for metric tracking/binding purposes, but without having to have a fully allocated and tracked CI for the resource. In this manner, a user wishing to track metrics for a resource of a CI can reference or utilize the resource table to bind the metric without having to designate the resource as a CI itself.

With the preceding in mind, the following figures relate to various types of generalized system architectures or configurations that may be employed to provide cloud-based services to an organization and on which the present approaches may be employed. Correspondingly, these system and platform examples may also relate to systems and platforms on which the techniques discussed herein may be implemented or otherwise utilized. Though a cloud-based computing environment is provided by way of one example of a suitable computing framework, it should be appreciated that the present approach may be implemented in other computing environments, including stand-alone computing environments as well as local networks without access to cloud-based resources. With this in mind, and turning to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 18. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers 22 with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 24 and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
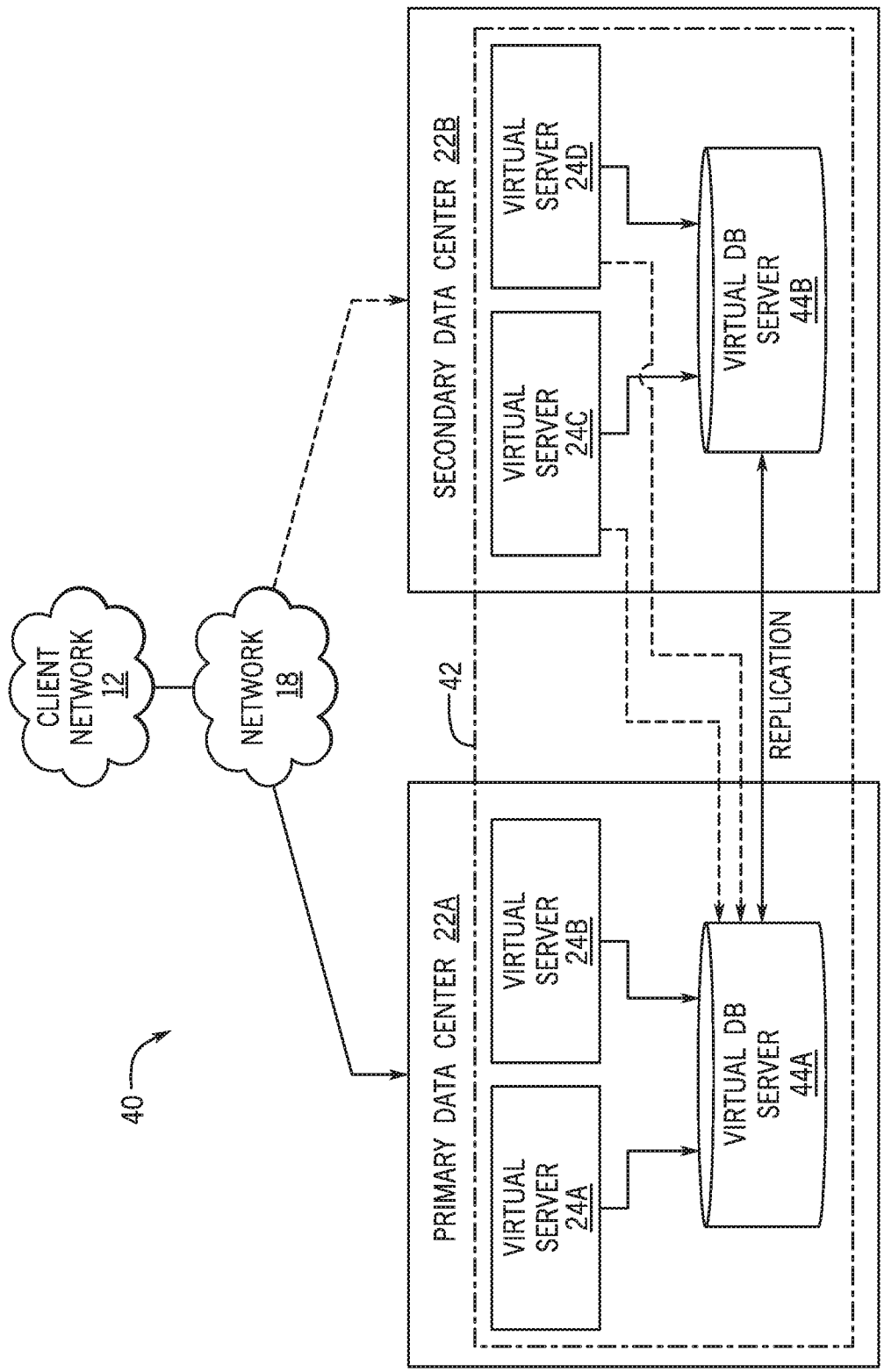
FIG. 2 is a schematic diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. In the depicted example, to facilitate availability of the client instance 42, the virtual servers 24A-24D and virtual database servers 44A and 44B are allocated to two different data centers 22A and 22B so that one of the data centers 22 acts as a backup data center. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A, 24B, 24C, 24D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
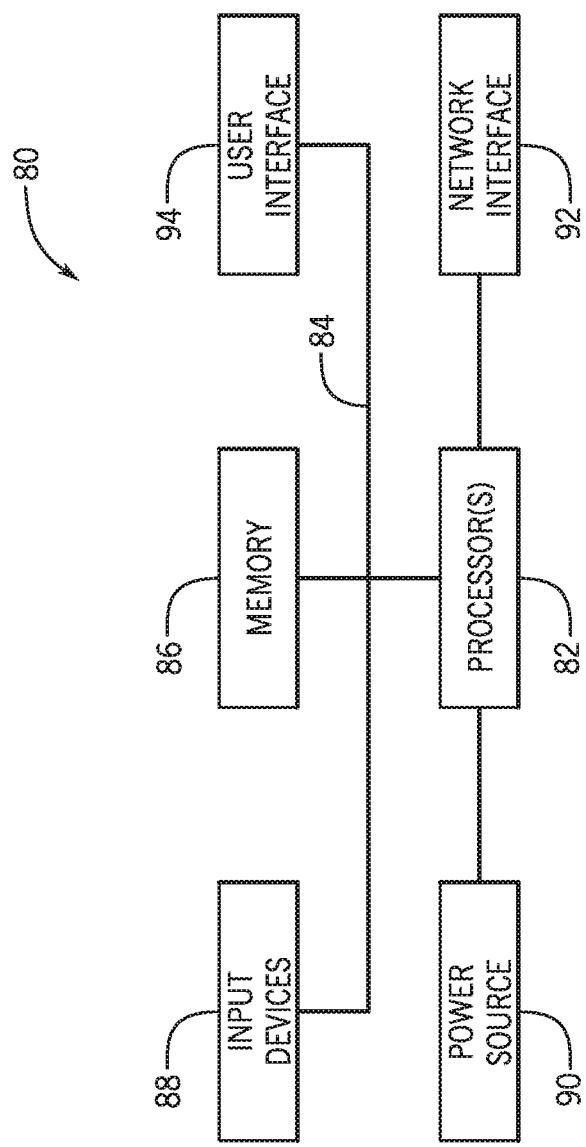
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, and by way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3 and may be present in the embodiments of FIGS. 1 and 2. FIG. 3 generally illustrates a block diagram of example components of a computing system 80 and their potential interconnections or communication paths, such as along one or more busses 84. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein. The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

As discussed herein, a database may consist of a number of tables, which are often defined based on some logical characteristic common to the records stored in the table (e.g., address information in an address table of a mailing database, error events in an error table of an event log, vehicles in a vehicle table of a registration database, and so forth). Each table in turn is characterized by a number of records for which one or more different types of data are stored in respective fields of the table. By way of example, in a vehicle registration database one table may have a record for each registered vehicle, with each vehicle record having associated fields for storing information specific to the respective vehicle (e.g., vehicle year, make, model, color, identification number, and so forth). In such an example, other tables may exist in the same database containing owner information, accident information, repair history, recall notices and so forth, with each table having its own set of records which in turn have respective fields related to the records within that table. In a relational database context, these tables may be linked together based on known relationships between tables (e.g., between owners and vehicles), allowing the stored data to be accessed or manipulated in useful ways.

In addition, each table may have multiple fields that are indexed or that serve as indexes, such that the table is more readily searched or manipulated when referenced by an indexed field. For the purpose of explanation and visualization, such a table may conceived of as records in rows within the table and the different fields of data for each record are columns. As will be appreciated however, such directionality and two-dimensionality is an arbitrary convention and should not be viewed as limiting.

In the case of a configuration management database (CMDB), as discussed by way of example herein, the database stores information about assets and enterprise services of an entity and the configurations of these assets and services. The asset and service data stored in a CMDB typically includes configuration items (CIs) that may relate to hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models).

In a conventional approach, the tables for a CMDB may be logically characterized based on classes (either abstract or concrete) corresponding to the type of data in question such that a separate structured query language (SQL) table exists for each logical class. As used herein, such separate SQL tables may also be referred to as separate physical tables, though it should be appreciated that the tables are logical constructs.

Figure 4:
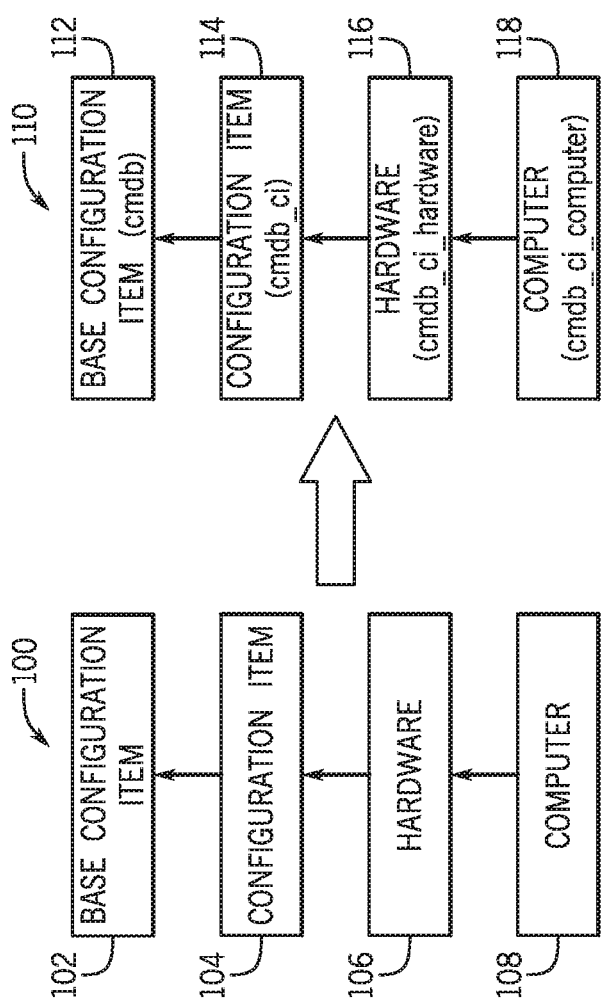
FIG. 4 depicts a class structure and a corresponding set of tables, in accordance with aspects of the present disclosure.

With respect to the logical class organization in a CMDB, turning to FIG. 4, a conceptual example of an arrangement of logical classes 100 corresponding to computer configuration items (CIs) is depicted. In this example, logical class examples corresponding to base configuration items 102, configuration items 104, hardware 106, and computers 108 are shown on the left. On the right, these logical classes 100 are organized as class-based tables 110, namely a base configuration item table (cmdb) 112, a configuration item table (cmdb_ci) 114, a hardware table (cmdb_ci_hardware) 116, and a computer table (cmdb_ci_computer) 118. Each table 110 may have records corresponding to a system identifier (sys id) or other suitable identifier for those systems falling within the respective logical class and corresponding fields of the respective class. By way of example, the base configuration item table 112 may have fields for a system identifier, system name, who the system is owned by, a system class name, and so forth. Similarly, the configuration item table 114 may have fields for system identifier, IP address, and so forth; the hardware table 116 may have fields for system identifier, hardware status, and so forth; and the computer table 118 may have fields for system identifier, operating system (OS), OS version, and so forth. In this manner, information appropriate for different organizational levels of the CMDB may be stored for use.

As a non-limiting example of an organization level of a CMDB, the discussion below relates to organization of a table-per-partition type database, as discussed in greater detail below. However, it should be appreciated that the embodiments of the present disclosure are not limited to a TPP-type organization, but may be implemented in other manners, such as table-per-class (TPC) or table-per-hierarchy (TPH) type organizations.

In one such implementation of a TPP approach, a table construct is created that logically appears as a single table to a user, but which is composed of multiple tables (i.e., multiple distinct physical tables) each capable of indexing a number of fields up to the maximum allowed by the database program (e.g., 64 indexes). In one such implementation, a single table, as discussed above, may be the initial state, with storage tables (i.e., partitions) added as needed, e.g., as the database grows. In such an approach, storage is flattened into a single level and joins are avoided or reduced relative to conventional table-per-class approaches.

The TPP approach, thus, involves partitioning a main table into two or more tables when a threshold condition, (e.g., an index boundary being exceeded) such that each partition table is a full table (i.e., a physical table) in the context of the database program. Each partition table, therefore, has available a full allotment of indexes and other resources consistent with what the underlying database program allows. Thus, a single, or main, table may be employed up to a point when a leaf class exceeds an index (or other) threshold on the main table, at which point a second partition in the form of a new table is created. In this scenario, columns that need indexes over the threshold go onto the second partition. The process may be repeated once the number of indexes (or other criterion) on the second partition reaches the threshold allowed by the database program.

As a practical matter, it should be noted that different partition tables may, to help improve query response, have duplicates of certain fields. For example, commonly accessed fields (e.g., master fields) may be copied and dynamically synchronized (such as using transactional writes) across partition tables. In particular, replicating such commonly referenced fields across partition tables may increase the likelihood that all fields referenced by a given query can be satisfied by accessing a single partition table, or may otherwise reduce the number of partition tables needing to be joined to generate a result set. By way of example, in one implementation all sys_* fields may be synchronized to all partitions. Likewise, display values (that aren't reference fields) and/or commonly queried fields may benefit from such replication, such as by reducing join operations in response to queries.

In this manner, replicating referenced fields across partition tables may reduce or eliminate the needs for joins in generating a result set for a given query, thereby improving performance with respect to the query. In practice the fields of a given partition table may be pre-configured or dynamically adjusted, such as based on query history or on predictions related to the other fields in a given partition table, to include fields commonly included in queries with respect to the other fields in a partition table. In this manner, the responsiveness to client queries may be enhanced by minimizing or eliminating joins when generating a result set for a query.

Though TPP is described in detail above as one possible database implementation suitable for use with the approaches described herein, it may be appreciated that other database implementations, such as TPC and TPH, may also be employed with the present approaches. As noted above, regardless of database implementation, a CMDB may be employed as part of an enterprise's efforts to track and manage their IT infrastructure. Such a CMDB may be organized based on CIs such as hardware, servers, databases, applications, and so forth. While such tracking using a CMDB may be efficient for monitoring certain configuration items, such approaches may be less efficient for monitoring more granular configuration items, as discussed herein. For example, when a user submits a query to retrieve data such as metric binding data, the fields associated the metric data are retrieved from relevant configuration items. However, the table containing the configuration item(s) in various records may include multiple fields that are related to fields of other records, as a result of the process of table generation. As such, certain fields may be irrelevant to a CI but are nonetheless still included as null fields within certain records in a CMDB. This may result in an inefficient utilization of allocated memory.

It is presently recognized that certain CIs may be organized using a resource-based hierarchy as this may facilitate more efficient utilization of memory for operation such as storing metric data. Further, a resource extraction layer, such as a table and/or category, may be utilized to link the CI hierarchy to the resource hierarchy such that both hierarchies may be implemented in existing CMDB organization techniques. As such, the resource extraction layer may facilitate linking metric data to resources or resource classes within a resource table. In some embodiments, new resource tables may be generated based on the query and a determination that a resource table does not currently exist within a database that includes the metric data. In situations where a resource table having the one or more resources does exist, then the metric data may be bound to the resource table, rather than having to generate an additional resource table and/or update an existing resource table.

Figure 5:
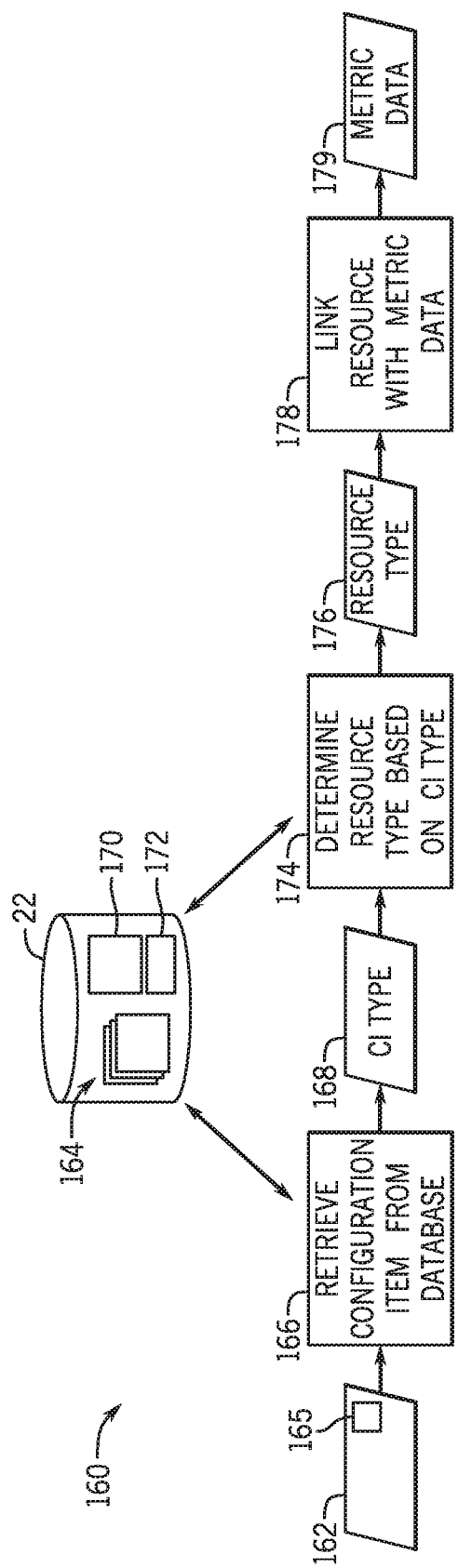
FIG. 5 is a schematic diagram for outputting metric data associated with a resource, in accordance with aspects of the present disclosure.

FIG. 5 illustrates a flow diagram 160 that shows how metric data maybe be linked to a resource in response to receiving a request for metric data. It should be appreciated that at least some of these steps may be executed by a processor, such as processor 82, a processor of a client device, or any suitable processor. As shown in FIG. 5, in response to receiving an input 162, such as a request (e.g., query) for metric data, a CI stored within a table 164 of a database 22 may be retrieved (e.g., block 166) from a database 22. In some embodiments, the action of block 166 may be performed by a processor of a client device 14. The input 162 may include associated metadata 165 that is indicative of a resource associated with the metric data. As a non-limiting example, the input 162 may include a request for disk usage. As such, the metadata 165 may identify certain disks within the enterprise, such as based on certain location and/or a groups within the enterprise.

The database 22 may be a CMDB with a TPP hierarchal organization, but it should be appreciated that the processor may also query a database having a TPH or TPC organization. In any case, a configuration item stored within a table 166 of the database 22 is retrieved based on the received input 162 such as a request for to track metric data (e.g., based on metadata associated with the metric binding data).

The retrieved CI may include a corresponding type, and the type may identify the CI as hardware, a server, a computer, an application, or the like, and the type of the CI 168 may be identified and used as an input to determine (e.g., block 174) a resource type associated with the type of the CI 168. For example, the resource type may be identified based on the type of the CI and a resource abstraction layer 170 stored in within the database 22. That is, a client device may access the resource abstraction layer upon receiving and/or identifying the type of CI 168 and output a resource type 176. As such, the metric data of the input 162 may be linked (e.g., block 178) to a resource, or resource table 172. Thus, metric data 179 may be generated via the resource, rather than a response accessing the CI, which may in turn, reduce memory usage and improve performance.

To further illustrate the flow diagram 160 above, FIG. 6 shows a table 180 having multiple records 182 with corresponding fields 184, 186, 188, 190, and 192. The table 180 may be the table 166 that was accessed during block 164 of the flow diagram 160. In this non-limiting example, each record 182 is related to a configuration item, such as different servers of an enterprise (e.g., 'Cust1_win_server', 'Cust2_win_server', 'Cust3_win_server', and 'Cust4_win_server'.) Each field 184, 186, 188, 190, and 192 includes data indicative of disk drive usage, in accordance with aspects of the present disclosure. While the illustrated embodiment of the table 180 shows only four records 182a, 182b, 182c, and 182d each with five associated fields 184, 186, 188, 190, and 192, it should be understood that in certain implementations, a record related to a server for an enterprise my include tens, hundreds, or thousands of fields that are each associated with usage of a hard disk. For example, there may be four thousand of these elements and, as such, when a database is querying such an element of the 'cmdb_ci_server' table, a response may include at least a portion of these elements and have a large memory footprint. Further, another consequence of having a relative large number of elements is that any analytics or transformation on each field related to disk usage is difficult as it is both memory and time intensive.

However, the table 180 has several fields, here a majority of the fields that are unpopulated due to the fields being specific to a CI on a respective device, i.e., a tracked CI (e.g., hardware, software, tracked metrics, etc.) is treated as a unique field for each different device it is tracked on. As a consequence, the same type of CI (e.g., processor, hard drive, tracked metric) on different types of devices may lead to different tracked fields for different devices, even though the same type of CI is being tracked in each case. In particular, the illustrated embodiment of the table 180, each server of the table 180 is organized based on the server (e.g., 'WinServer') associated with each customer (e.g., 'Cust1', 'Cust2', 'Cust3', and 'Cust4'), and field includes data indicative of both the customer and the disk (e.g., 'disk1' and 'disk2'). As shown, much of the allocation to the table may be devoted to storing empty or null fields. It is presently recognized that it is less memory intensive to have resource tables for certain CIs such as disks, processors, and/or web pages of applications that store data, such as metric data, rather than store the metric data related to certain CIs in a CI table in the manner shown.

FIG. 7 shows an example of a resource table 200 for linking metrics with resources of configuration items, in accordance with an embodiment of the present disclosure. The resource table 200 includes multiple records 202, which each have data within stored in various fields, which, as shown in the illustrated embodiment, include a CI field 204 and a resource field 206.

For example, turning briefly to FIG. 6, record 182a stores data related to the CI 'Cust1_win_server' that has associated fields 184 186, 188, 190, and 192 indicative of usage of certain disks (e.g., 'D1', D2', 'D3', and so forth). Additionally, the fields also have data associated with the customer as described above. While fields 184 and 186 of record 182a may include relevant data, such as usage data of customer 1 (e.g., Cust1), record 182a also includes fields 188, 190, and 192 that are null or empty as these fields are associated with customer 2 (e.g., Cust2). Despite the fields 188, 190, and 192 being null or empty in at least record 182a, resources (e.g., memory) are still allocated to these fields.

Returning back to FIG. 8, the first metric field 228 includes data indicated of the disk usage and the resource field 226 has data indicative of the resource (e.g., Disk 1, Disk 2, etc.). As such, there are fewer null or empty fields associated with the metric data (e.g., disk usage in this non limiting example) as the resource table 220 includes organization based on the resources (e.g., via resource field 226).

It should be appreciated that the resource table 220 may include additional or fewer metric fields 228, 230, and 232 and that this may be dependent on the type of resource, such as whether or not the resource corresponds to a disk, a processor, a website, or other such cases. Therefore, rather than including each record on the response, which may be memory intensive, the records 222 in the resource table 220 are included on the response. The records 222 on the resource table 220 may be relatively smaller than the records 182 in the table 180 and, thus, less memory intensive.

FIG. 8 shows an example of a resource abstraction layer 220 for linking a configuration item with a resource to facilitate this approach, in accordance with an embodiment of the present disclosure. The illustrated embodiment of the resource abstract layer 220 has records 222 with a first field 224 indicative of a type of CI and a second field 226 indicative of a resource class. As discussed above with respect to block 174 of the schematic diagram 160, generally, a type of CI relating to a received request for metric data may be identified. In turn, a processor of a client device, for example, may identify a resource class based on the identified type of CI. For example, a type of CI corresponding to the field 224 of the record 222a would return the resource class in the field 226 of the record 222a. Similarly, it should be appreciated that this may apply to the fields 224 and 226 of the records 222b, 222c, 222d, and 222e.

The identified resource class from the field 226 of the resource extraction table 220 may relate to a resource table. In some embodiments, a resource table may not exist for such a resource class from the field 226. As such, a resource table may be generated. In general, the resource table may include a field related to the CI, a field relating to the identity of the resource, and one or more fields having various other categories, such as metric data associated with the resource.

As discussed herein, in some embodiments a received input may be related to putting metric data indicative related to a website, which may not be a configuration item with the database. FIG. 9 shows another example of a resource table 240 for linking metrics with resources of configuration items, in accordance with an embodiment of the present disclosure. The resource table 240 includes multiple records 242, which each have data within stored in various fields, which, as shown in the illustrated embodiment, include a CI field 244, a resource field 246, a first metric field 248, a second metric field 250, and a third metric field 252. It should be appreciated that the resource table 240 may include additional or fewer metric fields 248, 250, and 252 and that this may be dependent on the type of resource, such as whether or not the resource corresponds to a disk, a processor, a website, or other such cases. Similar to the resource table 200 shown in FIG. 7, the illustrated embodiment of the resource table 240 includes no null or empty field based at least in part on the additional organization imparted by the resource field 246.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for outputting metric data related to one or more resources, comprising:
a non-transitory, machine-readable medium;
a client instance hosted by one or more data centers, wherein the client instance is accessible by one or more remote client networks; and
a database accessible by the client instance, wherein the system comprises a processor configured to execute instructions stored in the non-transitory, machine-readable medium to perform operations comprising:
receiving a request to track metric data related to a resource of the one or more resources;
identifying a first table within the database accessible by the client instance based at least in part on data associated with the request, wherein the first table comprises a first plurality of records each storing information associated with a different configuration item (CI), wherein a first record of the first plurality of records stores data associated with a first configuration item (CI), first metric data associated with the resource associated with the first CI, second metric data associated with one or more additional resources associated with the first CI, and one or more null fields;
identifying a CI type of the first CI;
identifying a resource type associated with the CI type of the first CI based at least in part on a resource abstraction layer accessible by the client instance, wherein the resource abstraction layer comprises relationships between a plurality of CI types and a plurality of resource types; and
generating a second table within the database that links the CI type and the resource type, wherein the second table comprises a second plurality of records each storing information associated with a different resource and CI combination, wherein the information associated with the different resource and CI combination comprises one of the first metric data or the second metric data, and wherein the first record of the second plurality of records comprises fewer null fields than the first record of the first plurality of records.

2. The system of claim 1, wherein the resource abstraction layer is a resource table comprising a third plurality of records each including a first field having data indicative of a different resource of the one or more resources associated with the plurality of resource types, and the third plurality of records each including a second field having data indicative of a CI type of the plurality of CI types.

3. The system of claim 2, wherein identifying the resource type associated with the CI type comprises:
identifying data indicative of the resource type, wherein the data indicative of the resource type is stored in a first field of a record of the third plurality of records in the resource table; and
identifying data indicative of the CI type, wherein the data indicative of the CI type is stored in the second field of the record of the third plurality of records in the resource table.

4. The system of claim 1, wherein the first metric data relates to an operational capacity of the resource.

5. The system of claim 1, wherein the resource is a type of hardware asset.

6. The system of claim 1, wherein the resource is a webpage of an application, a component of an application, or both.

7. The system of claim 1, wherein the resource abstraction layer is a category.

8. The system of claim 1, wherein receiving the request to track the metric data comprises determining whether this is a first time a request to track the metric data related to the resource has been received; and
generating a resource table that includes the resource upon determining that this is the first time the request has been received.

9. The system of claim 1, wherein identifying the resource type associated with the CI is based at least in part on a comparison of the CI type with a record of the resource abstraction layer.

10. The system of claim 1, wherein the database is organized in a table-per-partition (TPP) hierarchy.

11. A method for outputting metric data associated with a resource, comprising:
receiving a request to track metric data related to the resource of an enterprise;
identifying a first table stored within a database based at least in part on data associated with the request, wherein the first table comprises a first plurality of records each storing information associated with a different configuration item (CI), wherein a first record of the first plurality of records stores data associated with a first configuration item (CI), first metric data associated with the resource associated with the first CI, second metric data associated with one or more additional resources associated with the first CI, and one or more null fields;
identifying a CI type of the first CI;
identifying a resource type associated with the first CI based at least in part on a resource abstraction layer, wherein the resource abstraction layer comprises relationships between a plurality of CI types and a plurality of resource types;
generating a second table that links the CI type and the resource type, wherein the second table comprises a second plurality of records each storing information associated with a different resource and CI combination, wherein a first record of the second plurality of records stores one of the first metric or the second metric data, and wherein the first record of the second plurality of records comprises fewer null fields than the first record of the first plurality of records; and
outputting the metric data associated with the resource from the second table.

12. The method of claim 11, wherein the resource abstraction layer is a table comprising a plurality of fields, and wherein identifying the resource type associated with the first CI comprises identifying data indicative of a resource type stored in a first field of the resource abstraction layer that corresponds to data indicative of the CI type stored in a second field of the resource abstraction layer.

13. The method of claim 11, wherein linking the CI type and the resource type comprises retrieving a resource table that includes the resource and the first metric data stored in a field of the resource table.

14. The method of claim 11, wherein linking the CI type and the resource type comprises linking the resource type to an existing resource table that is stored within the database.

15. A tangible, non-transitory, machine-readable medium, comprising machine-readable instructions, wherein the machine-readable instructions, when executed by one or more processors cause the one or more processors to:
receive a request to track metric data related to a resource;
identify a configuration item table from a database based at least in part on data associated with the request, wherein the configuration item table comprises a first plurality of records each storing information associated with a different configuration item (CI), wherein a first record of the first plurality of records stores data associated with a first configuration item (CI), first metric data associated with the resource associated with the first CI, second metric data associated with one or more additional resources associated with the first CI, and one or more null fields;
identify a CI type of the first CI;
identify a resource type associated with the first CI based at least in part on a resource abstraction layer, wherein the resource abstraction layer comprises relationships between a plurality of CI types and a plurality of resource types;
identify a resource table from the database that includes the resource based on the identified resource type, wherein the resource table comprises a second plurality of records each storing information associated with a different resource and CI combination, wherein a first record of the second plurality of records stores one of the first metric data or the second metric data, and wherein the first record of the second plurality of records comprises fewer null fields than the first record of the first plurality of records; and
output metric data associated with the resource from first record of the resource table.

16. The tangible, non-transitory, machine-readable medium of claim 15, wherein identifying the resource type associated with the CI type comprises identifying data indicative of the resource type stored in a first field of the resource table that corresponds to data indicative of the CI type stored in a second field of the resource table.

17. The tangible, non-transitory, machine-readable medium of claim 15, wherein receiving the request to track metric data comprises determining whether this is a first time a request to track the metric data related to the resource has been received.

18. The tangible, non-transitory, machine-readable medium of claim 17, wherein retrieving the resource table comprises generating the resource table that includes the resource upon determining that this is the first time the request has been received.

19. The tangible, non-transitory, machine-readable medium of claim 15, wherein a second record of the second plurality of records stores a different one of the first metric data or the second metric data as compared to the first record of the second plurality of records.

20. The method of claim 11, comprising:
determining that the first table comprises the one or more null fields; and
generating the second table that links the CI type and the resource type based on the one or more null fields being present in the first table.

* * * * *